United States Patent [19]

Heidrick, Jr.

[11] 4,133,440
[45] Jan. 9, 1979

[54] TRAILER CARRIER

[76] Inventor: Joseph A. Heidrick, Jr., Rte. 4, Box 686, Woodland, Calif. 96595

[21] Appl. No.: 906,651

[22] Filed: May 16, 1978

Related U.S. Application Data

[63] Continuation of Ser. No. 754,587, Dec. 27, 1976, abandoned.

[51] Int. Cl.$^2$ .............................................. B60P 1/04
[52] U.S. Cl. .................................. 214/506; 214/85.5; 296/1 A
[58] Field of Search ............... 214/505, 506; 296/1 A; 105/368 B

[56] References Cited

U.S. PATENT DOCUMENTS

| | | | |
|---|---|---|---|
| 2,761,577 | 4/1963 | Lahman | 214/506 |
| 2,786,590 | 3/1957 | Edwards et al. | 214/506 |
| 2,884,870 | 5/1959 | Day | 105/368 B |
| 2,992,750 | 7/1961 | Brock | 214/506 |
| 3,083,986 | 4/1963 | Moody et al. | 214/506 |
| 3,138,125 | 6/1964 | Reaves | 280/472 |
| 3,693,818 | 9/1972 | Teagarden | 214/506 |
| 3,944,095 | 3/1976 | Brown | 214/506 |
| 4,019,643 | 4/1977 | Kampmann et al. | 280/472 |

FOREIGN PATENT DOCUMENTS 2257463  8/1975  France ...................... 214/506

Primary Examiner—Francis S. Husar
Assistant Examiner—Lawrence E. Williams
Attorney, Agent, or Firm—Lothrop & West

[57] ABSTRACT

A trailer carrier includes a tractor-drawn, fore and aft elongated bed supported on ground engaging wheels transversely spaced to conform to furrow center lines in a row crop field being mechanically harvested. The bed is tiltable between a first position wherein the after end of the bed engages the ground to afford an on-ramp and an off-ramp for a roadworthy trailer and a second position wherein the bed is substantially horizontal while the carrier transports the superposed trailer alongside an operating harvester to receive the crop being harvested.

Projecting forwardly from the carrier is a fixed upper frame carrying a winch to facilitate trailer movement onto and off the carrier and a pivoted lower frame for connection to the tractor, a jack being interposed between the upper and lower frames to move the bed between the first and second positions.

3 Claims, 7 Drawing Figures

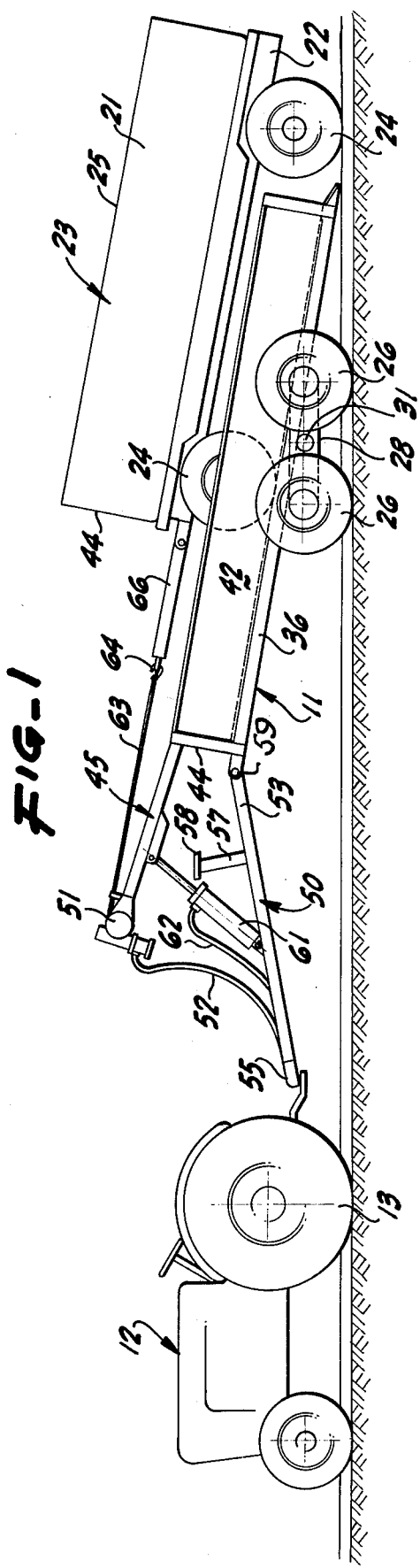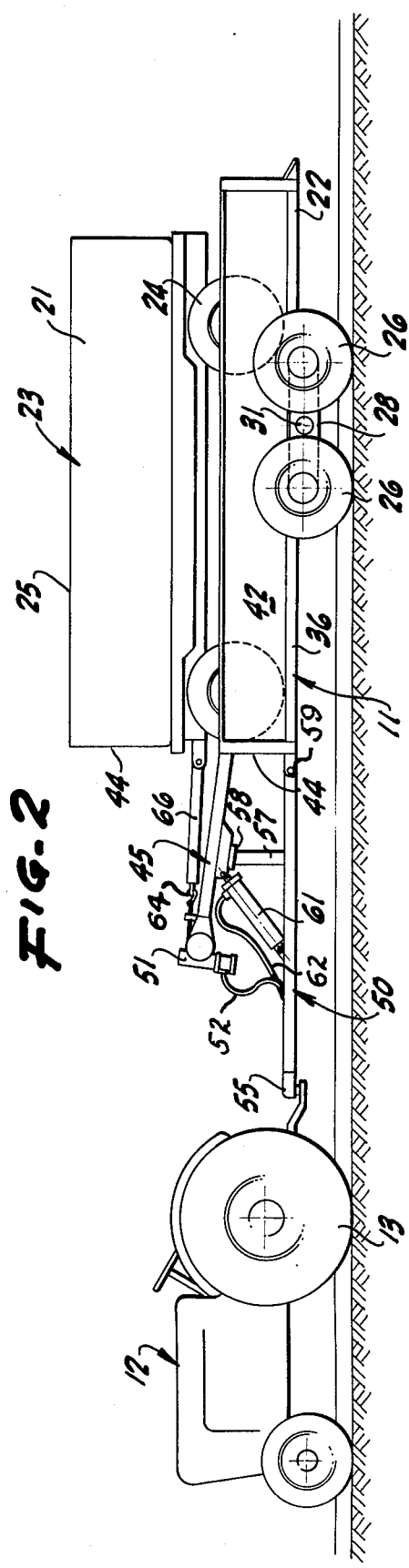

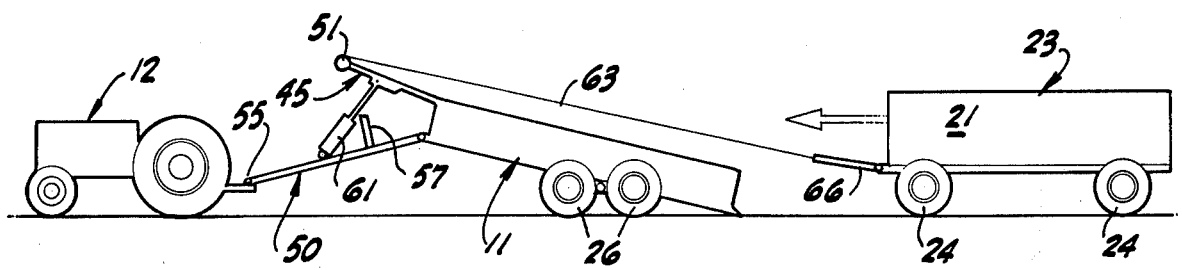
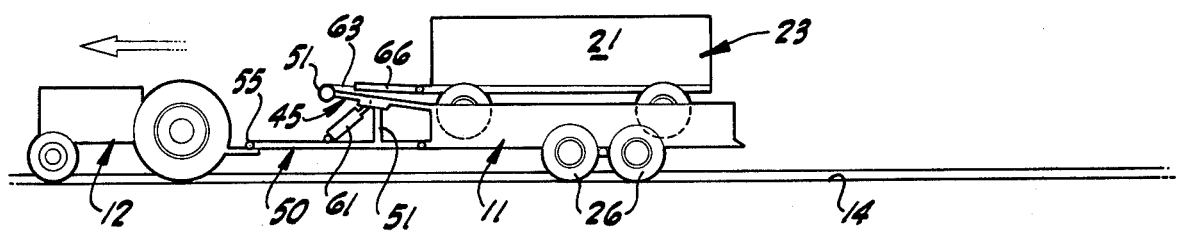
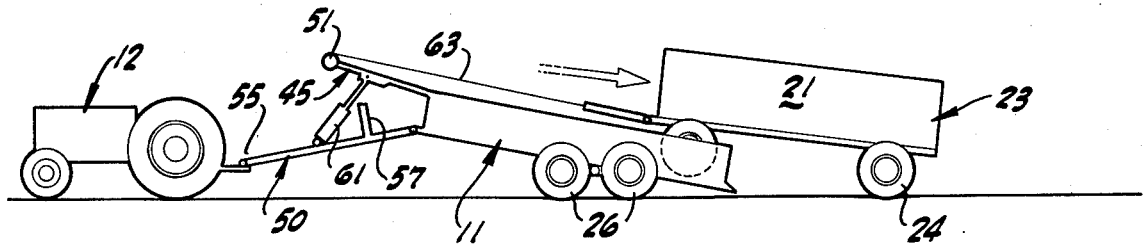

TRAILER CARRIER

This is a continuation, of application Ser. No. 754,587, filed Dec. 27, 1976, now abandoned.

BACKGROUND OF THE INVENTION

Tiltable carrier beds are known in the art, exemplary being the disclosure in the United States patents to Houck U.S. Pat. Nos. 1,352,898, Skaggs 3,647,097 and Brown 3,944,095. Still other patents illustrate trailer tilting structures for especial use in hauling, launching and recovering boats, as in Jones 2,711,259 and Holsclaw 2,823,817. However, the after end of a boat trailer needs to tilt only to about water level, not to ground level; and, so far is known, none of the prior art patents, including Houck, Skaggs and Brown, deals with the problem of transporting a roadworthy trailer (i.e. a standard trailer having the conventional transverse wheel spacing of eight feet) alongside a mechanical harvester of field crops grown in rows having their furrows spaced on centers five or five and a half feet apart. As can be visualized, there is no way that a standard trailer can be towed alongside a harvester without the wheels at least on one side of the trailer running over and crushing the crop, such as tomatoes, underneath the trailer wheels.

In short, both in the patent literature and in the market place, there remains considerable room for improvement.

SUMMARY OF THE INVENTION

The invention relates to a wheeled, tractor-drawn carrier capable of running in furrows having centerlines spaced on the order of five feet apart and of on-loading an empty trailer of standard make transporting the trailer alongside a harvester to receive the crop being harvested and off-loading the full trailer to allow the trailer to haul the crop to a cannery for processing.

It is an object of the invention to provide a trailer carrier which enables a row crop to be mechanically harvested and loaded in a standard roadworthy trailer without crushing the plants in at least one row each time the harvester makes a pass over a field being harvested.

It is another object of the invention to provide a carrier which enables a single operator to on-load, transport and off-load a standard trailer, thereby effecting substantial economies.

It is yet another object of the invention to provide a trailer carrier in which the transverse spacing between the wheels can be selectively adjusted, within limits, to conform to different furrow spacings.

It is a further object of the invention to provide a carrier which is capable of transporting a trailer having a large tank-like vessel, or tub, mounted thereon to receive, in bulk, a very substantial quantity of harvested crop, such as tomatoes.

It is another object of the invention to provide a generally improved trailer carrier. Other objects, together with the foregoing, are attained in the embodiment described in the accompanying description and illustrated in the following drawings.

BRIEF DESCRIPTION OF DRAWINGS

FIG. 1 is a side elevational view showing the carrier bed in tilted attitude, and with a trailer in the process of being loaded on or off the carrier;

FIG. 2 is a side elevational view showing the carrier and trailer in the horizontal attitude assumed while traveling alongside a mechanical harvester;

FIG. 5 is a diagrammatic representation, to a reduced scale, showing a tractor and carrier with an empty trailer preparatory to being hauled aboard the carrier;

FIG. 6 is a view comparable to FIG. 5 but with the carrier and trailer in horizontal attitude, as during harvesting; and, FIG. 7 is a view comparable to FIG. 5 but showing the trailer being off-loaded from the carrier under the force of gravity and being restrained by the winch.

DETAILED DESCRIPTION OF PREFERRED EMBODIMENT

Figure 3:
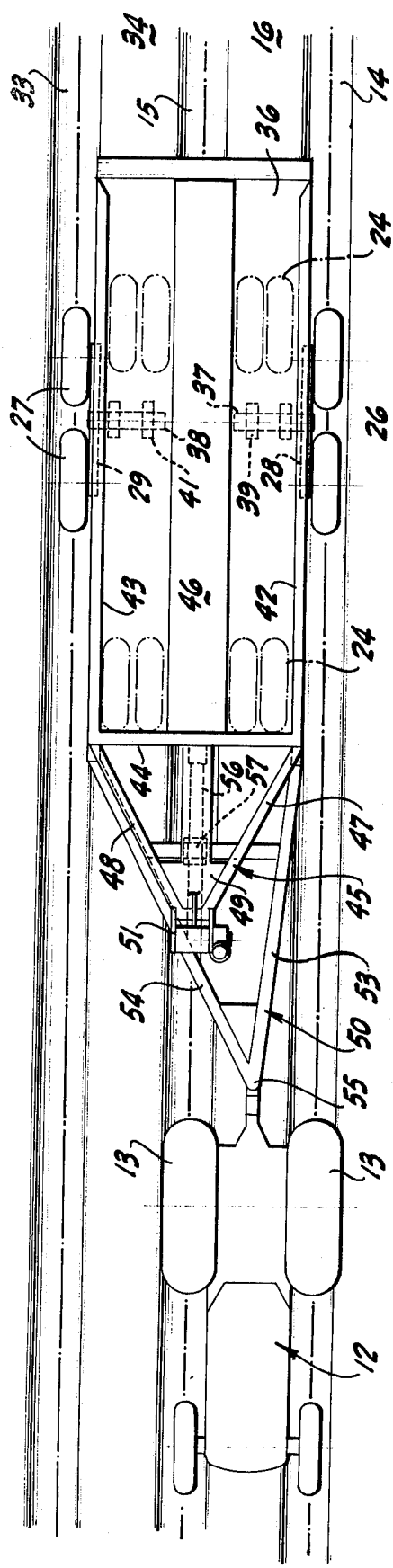
FIG. 3 is a top plan view of the carrier, per se, but with the hydraulic jack omitted.

While the trailer carrier of the invention is susceptible of numerous physical embodiments, depending upon the environment and requirements of use, substantial numbers of the herein shown and described embodiment have been made, tested and used and all have performed in an eminently satisfactory manner.

The trailer carrier of the invention, generally designated by the reference numeral 11, is towed by a suitable draft vehicle, such as a tractor 12, having its large rear drive wheels 13 set to travel along two adjacent furrows 14 and 15. These can be considered as the first furrow and the second furrow in a field in which a row crop such as tomatoes or melons are being harvested by a mechanical harvester, not shown. The two furrows 14 and 15 define or bound a raised bed 16, or row, in which the crop grows.

In well known fashion, mechanical harvesters travel along the row being harvested, underground knives being used to sever the vines from the roots. The severed vines and attached tomatoes are carried through a shaker section of the harvester where the tomatoes are separated from the vines and the empty vines are dropped onto the ground. The tomatoes then undergo inspection, the culls being returned to the ground. Tomatoes passing the grading tests are conveyed to an elevator located on the tomato discharge side of the harvester and from the elevator the tomatoes have heretofore been allowed to fall by gravity into a receptacle on a trailer towed alongside the harvester.

Figure 4:
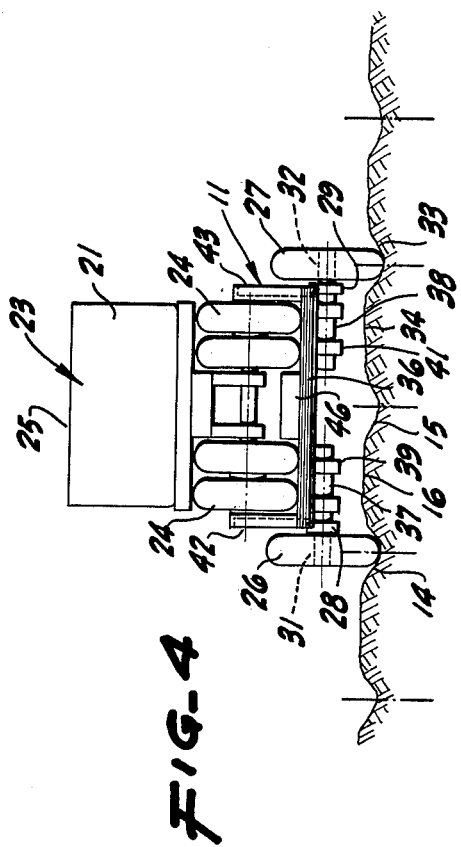
FIG. 4 is an elevational view of the after end of the carrier with a trailer supported thereon.

Within recent years, the receptacle has often been a large (e.g. 8 feet × 4 feet × 20 feet) plastic tub 21, or tank, detachably mounted on the flat bed 22 of a standard, roadworthy trailer 23 having wheels 24 spaced apart transversely by the customary eight feet. The trailer wheels 24 are frequently of the dual type, as appears in FIG. 4. The tank 21 is open at the top 25 and receives tomatoes, or other suitable row crops, in bulk manner. When the tank 21 is filled, the trailer 23 is hauled to a grading station and thence to a cannery where the tomatoes are unloaded and processed.

Owing to the fact that the customary spacing between the rows of most row crops is five feet, it can be seen that while the tractor wheel spacing is five feet and the spacing between the wheels of a harvestor (not shown) can be made a multiple of five feet, for example, ten feet, so that the wheels travel along the furrows and thus avoid damaging the crop, it is not possible for the customary roadway trailer with its eight foot wheel spacing to be towed alongside a harvester without having the wheels on at least one side of the trailer running over and crushing the tomatoes in the subjacent row. Since this extensive damage takes place each time a harvester makes a pass from the beginning to the end of a row of tomatoes, the total crop loss becomes very costly.

By transporting the roadworthy trailer along the rows on a carrier having appropriately arranged wheels, damage to the crop is eliminated. In accordance with the invention, the trailer carrier 11 is provided with a pair of longitudinally spaced left wheels 26 and a longitudinally spaced pair of right wheels 27, each pair being rotatably mounted on the ends of fore and aft beams 28 and 29 centrally journaled on stub shafts 31 and 32, respectively. The fore and aft wheel pairs 26 and 27 conform to the center lines of the furrow 14 and a furrow 33 that can be considered as a third furrow adjacent and on the far side of the second furrow 15, the second and third furrows bounding another row of crops.

Typically, the furrows 14 and 15 and the furrows 15 and 33 are each five feet apart, with the transverse spacing between the furrows 14 and 33 being 10 feet. Another row 34 of plants grows between the furrows 15 and 33. The wheel pairs 26 and 27, in other words, span both crop rows 16 and 34 and, by moving along furrows 14 and 33, as appears most clearly in FIG. 4, the wheels avoid any damage to the crop being harvested.

The trailer carrier 11 further comprises a fore and aft, elongated bed 36 tiltably supported by the wheels 26 and 27. More specifically, a pair of transversely aligned trunnions 37 and 38 is securely fixed to the left and right bottom portions of the bed 36 by clamps 39 and 41, respectively. The outer ends of the trunnions 37 and 38 form the above-mentioned stub shafts 31 and 32 pivotally connected to the centers of the longitudinal beams 28 and 29 respectively. In this manner, the bed 36 is tiltably supported by the wheels 26 and 27 about the trunnions 37 and 38. The clamps 39 and 41 may be loosened to permit transverse adjustable movement of the trunnions 37 and 38 to accurately set the spacing between the wheels 26 and 27 and enable the trailer carrier 11 to be adapted for use in fields where the spacing between the furrows differs somewhat from 10 feet. To accomplish the adjustment, the clamps on one side of the bed are loosened, the same side of the bed is jacked up slightly to take the weight of the respective trunnion and the entire assembly of the trunnion, beam and wheels is transversely slid to the required position. The clamps are then tightened, and the procedure is repeated for adjustment of the wheels on the other side of the bed.

As will be realized other types of wheel mounting structures could be used to adjust transverse spacing, within limits, of the rockable beam and wheel construction disclosed herein.

The bed 36 is provided with side walls 42 and 43 and a front wall 44 and also an elongated longitudinal ridge 46 extending between the side walls 42 and 43, the side walls and the ridge serving to guide the wheels 24 of the trailer 23 as the trailer moves onto or off the carrier.

Extending rigidly forwardly from the top of the front wall 44 of the carrier is an upper winch frame 45 including a forwardly converging pair of left and right frame members 47 and 48 and a cross member 49 spanning the frame members 47 and 48. A winch 51 is supported on the rigid upper frame 45 at the ends of the frame members 47 and 48 above the central furrow 15. The winch 51 is typically of the hydraulically driven type and is powered from the tractor 12 through hydraulic lines 52.

A lower tractor hitch frame 50 comprises left and right frame members 53 and 54 pivotally connected by a pair of pivot pins 59 to the carrier bed 36 at the bottom of the front wall 44. The forward ends of the frame members 53 and 54 are joined together and include a suitable hitch 55 connected to the back of the tractor 12 at a position centrally spaced between the furrows 14 and 15. It will be noted from FIG. 3 that the lower hitch frame 50 is skewed relative to the fixed upper winch frame 45 so as to provide an offset enabling the tractor to haul the carrier using the customary center hitch of the tractor. By using a center hitch, the tractor operator can readily maneuver the carrier both in backing and turning. The disclosed hitch arrangement also centers the draw bar effort exerted by the tractor. At the same time, the centralized location of the winch provides a straight through force on the trailer both during onloading and off-loading of the trailer.

The lower hitch frame 50 further comprises a fore and aft frame member 56 located on the central longitudinal axis of the carrier and pivotally connected to the carrier bed 36 at the same height as the frame members 53 and 54. The frame member 56 is rigidly joined to the frame member 54 and is situated above and parallel to the central furrow 15. An upstanding pedestal 57 is fixed to the longitudinal frame member 56 and is provided with a resilient support pad 58 made of rubber or the like at its upper extremity on which the transverse member 49 of the upper winch frame 45 is supported when the carrier is in horizontal attitude.

An actuator such as a hydraulic jack 61 is connected between the frame member 54 of the lower hitch frame 50 and the cross member 49 of the upper winch frame 45 and is powered from the tractor 12 through conventional hydraulic lines 62.

To load an empty trailer 23 onto the trailer carrier 11, the trailer carrier 11 is moved by the tractor 12 into position ahead of the trailer 23 as viewed schematically in FIG. 5. The hydraulic jack 61 is extended to tilt the carrier bed 36 backwardly (clockwise in FIG. 5) until the after end thereof abuts the ground. A cable 63 of the winch 51 is then connected by means of a hook 64 to a hitch 66 of the trailer 23 pivotally extending forwardly from the trailer bed 22. The winch 51 is then driven to pull the trailer 23 forwardly and upwardly onto the trailer carrier 11 with the trailer centered as appears in FIG. 4.

FIG. 1 shows the trailer 23 partly loaded onto the trailer carrier 11. When the forward wheels 24 of the trailer 23 abut the front wall 44 of the trailer carrier 11 as indicated in FIG. 6, the winch 51 is stopped and the hydraulic jack 61 is retracted to tilt the bed 36 forwardly (counterclockwise) to a substantially horizontal position in which the cross member 49 abuts the support pad 58.

The center of gravity of the combination of the trailer 23 and carrier bed 36 is designed to be somewhat forward of the trunnions 37 and 38 so that the forward end of the carrier bed 36 is urged downwardly and slightly forwardly and the cross member 49 of the fixed upper frame 45 is maintained in abutment with the support pad 58 on the lower frame 50 by gravity. During the operation of tilting the bed 36 slightly forwardly the cable 63 will slacken somewhat. The winch 51 is energized to take up the slack when the bed 36 reaches the horizontal position and is then locked to immobilize the trailer 23 on the trailer carrier 11.

With the trailer 23 loaded on the trailer carrier 11, the superposed combination may be pulled by the tractor 12 along the furrows as illustrated in FIG. 6 to harvest the crop from the rows of the field. The harvester (not shown) may be driven on either side of the trailer 23 to deposit the harvested crop into the tank 21.

To unload the crop filled trailer 23 from the trailer carrier 11, the winch 51 is first actuated in order slightly to slacken the cable 63. The hydraulic jack 61 is then extended to tilt the bed 36 backwardly from the horizontal position of FIG. 6 to the tilted ramp-like position of FIG. 7 into engagement with the ground. The winch 51 is then actuated to pay out the cable 63 allowing the trailer 23 to roll off the carrier bed 36 under the force of gravity, and to the positions illustrated consecutively in FIGS. 7 and 5. The speed of movement of the trailer 23 down the bed 36 is controlled since the winch 51 restrains the trailer 23 from moving faster than the speed at which the winch 51 pays out the cable 63. The roadworthy trailer 23, after disconnection from the winch 51, may be towed by a highway draft vehicle to a market, cannery or other outlet facility for the crop.

In summary, it will be seen that the present invention solves the problem of using a roadworthy trailer having a wheel spacing of typically eight feet for the harvesting of a crop in a field where the furrows are spaced apart by typically five feet. The trailer, after being transported through the field by the trailer carrier of the invention to receive the harvested crops is merely rolled off the trailer carrier and towed to market over the public highway system, thereby eliminating crop destruction and the need for transferring the harvested crop from one trailer to another. Many modifications will become possible for those skilled in the art after receiving the teachings of the present disclosure without departing from the scope thereof.

What is claimed is:

1. A trailer carrier for transporting a roadworthy trailer through a row crop field, said trailer having road wheels of a normal roadway tread width, said trailer carrier comprising:
    an elongated bed of a width to support and transport said trailer and having ground engaging wheels laterally spaced apart a distance greater than said normal roadway tread width;
    hitch means pivotally connected to said bed on a transverse axis for connecting said trailer carrier to a tractor having laterally spaced ground wheels of a tread width less than that of said carrier, said hitch means being skewed relative to said bed and when engaged with said tractor the wheels on one side of said carrier are longitudinally aligned with the wheels on the corresponding side of said tractor; and
    actuator means connected to said bed and to said hitch means for selectively tilting the bed between a first position in which the after end of the bed engages the ground to afford an on-ramp and an off-ramp for the trailer and a second position wherein the bed is substantially horizontal to transport a trailer thereon.

2. A carrier as defined in claim 1 including upstanding stop means on said hitch engageagble with a projection rigid with said bed to hold said bed in said second position.

3. A carrier as defined in claim 2 wherein said projection extends forwardly from said bed, a power operated winch on the forward end of said projection.

* * * * *